(12) United States Patent
Cross et al.

(10) Patent No.: US 6,453,572 B2
(45) Date of Patent: Sep. 24, 2002

(54) FLOOR COVERING ESTIMATING DEVICE

(75) Inventors: James P. Cross; Kenneth L. Gort, both of Grandville, MI (US)

(73) Assignee: Cross-Tek, LLC, Grandville, MI (US)

( * ) Notice: Subject to any disclaimer, the term of this patent is extended or adjusted under 35 U.S.C. 154(b) by 23 days.

(21) Appl. No.: 09/681,205

(22) Filed: Feb. 22, 2001

Related U.S. Application Data

(60) Provisional application No. 60/183,948, filed on Feb. 22, 2000.

(51) Int. Cl.$^7$ ............................. G01B 5/02; G01B 5/26
(52) U.S. Cl. ........................ 33/563; 33/121; 33/1 SB; 33/494
(58) Field of Search ..................... 33/1 B, 1 G, 1 AA, 33/1 BB, 1 SB, 1 SD, 121, 494, 562, 563

(56) References Cited

U.S. PATENT DOCUMENTS

| | | | | |
|---|---|---|---|---|
| 2,747,795 A | * | 5/1956 | Kreuttner | 33/1 B |
| 2,770,044 A | * | 11/1956 | Wood | 33/121 |
| 4,827,621 A | * | 5/1989 | Borsuk | 33/494 |
| 5,477,617 A | * | 12/1995 | Guy | 33/1 SB |

* cited by examiner

*Primary Examiner*—G. Bradley Bennet
(74) *Attorney, Agent, or Firm*—McGarry Bair LLP

(57) ABSTRACT

A device for estimating the length of the floor covering needed from a roll of floor covering having a predetermined width to cover a room, including any fill area based on a scale diagram of the room showing walls bounding the room. The device comprises a generally planar body having an upper surface and opposing lower surface for contacting the diagram. A first positioning guide is provided on the body for aligning the body on the diagram about a first direction. A second positioning guide is provided on the body for aligning the body on the diagram about a second direction. Floor covering width and length indicia are provided on the body along the first and second axes, respectively. A fill width indicia is provided on the body and corresponds to the first direction. A data matrix comprising multiple cells is defined by the intersection of the fill width indicia and the floor covering length indicia. At least some of the cells contain a fill length data indicium having a value that represents the length of the floor covering needed for a fill area corresponding to the intersecting fill width indicium and floor covering length indicium itself.

21 Claims, 7 Drawing Sheets

FLOOR COVERING ESTIMATING DEVICE

CROSS REFERENCE TO RELATED APPLICATIONS

This application claims priority under 35 U.S.C. § 119 on U.S. provisional application Ser. No. 60/183,948, filed on Feb. 22, 2000.

BACKGROUND OF INVENTION

1. Field of the Invention

The invention relates to a device for quickly and easily estimating the required floor covering for a particular sized room and, more particularly, to an estimating device that determines the extra length of floor covering required to cover the fill area for a specified room and a specified floor covering width.

2. Description of the Related Art

All commercial and residential construction typically includes one or more rooms whose floor is covered by a floor covering that is manufactured in rolls of predetermined width. Typical floor covering materials include carpet, linoleum, etc. Carpeting, for example, is commonly manufactured in widths of 12 feet, 13 feet 6 inches, and 15 feet.

Throughout the construction process, there is a repeated need to estimate the amount of floor covering needed to cover a particular room. The contractor, wholesaler, and floor covering salespeople can all have a need to estimate the quantity of floor covering needed to cover a particular room.

The floor covering estimating process is susceptible to many sources of errors or inefficiencies. One source of error occurs because most rooms, even rectangular rooms have at least one room dimension that does not coincide with the manufactured width for a particular floor covering, resulting in the major portion of the room being covered by a single piece of the floor covering having a length equal to the room dimension and a width equal to the manufactured width (the full width area or full run portion) and the remainder of the room (the fill area generally having a width less than the floor covering manufactured width) being filled by sections of the floor covering cut to a width less than the floor covering manufactured width. Depending on the shape of the room, it can have multiple fill areas.

The length of floor covering needed to cover the full width area is simple to calculate. The fill area is more difficult to calculate because the floor covering manufactured width typically does not coincide with the fill area width and it is desirable to minimize the total area of floor covering purchased to cover the full width area and the fill area, requiring the estimator to determine which fractions of the manufactured width will most efficiently cover the fill area while minimizing the additional length of the floor covering that must be purchased. The calculation of the extra length needed to cover the fill area is exacerbated in that the fill area for most rooms will vary depending on which dimension or direction the full width run is oriented. For example, in a rectangular room, the room has a major dimension and a minor dimension. Depending on the length of the major and minor room dimension and the floor covering manufactured width, making the full width run parallel to one of the major and minor dimensions will result in a lower total area of floor covering than if the full width run is parallel to the other dimension. To determine which dimension the full width run should align with to minimize the total floor covering area required, the estimator must make multiple estimations of the total area of floor covering required by orienting the full width floor covering run along both of the dimensions and then calculating the corresponding fill to determine the floor covering orientation that results in the minimum area of floor covering. The need to calculate multiple estimates on a single room increases the likelihood that an error might be made by the estimator.

The potential source for error in estimating the appropriate amount of floor covering is further exacerbated in that many types of floor covering are sold in square yards and most building plans are sized in square feet. Although the mathematical conversion from square yards to square feet or visa versa is well known and relatively common, in practice, the actual calculation is the source of many errors. The errors in the area calculation is compounded by not all blueprints being drawn to the same scale, which can lead to an incorrect calculation for the total area of the room.

There is a need in the floor covering industry to have a simple and easy to use device for quickly calculating the minimum amount of floor covering required for a particular room while accounting for the particular scale of a drawing, the particular width of the floor covering, and the particular dimension in which the floor covering is sold.

SUMMARY OF INVENTION

The invention relates to a device for estimating the length of the floor covering needed from a roll of floor covering having a predetermined width to cover a room, including any fill area based on a scale diagram of the room showing walls bounding the room. The device comprises a generally planar body having an upper surface and opposing lower surface for contacting the diagram. A first positioning guide is provided on the body for aligning the body on the diagram about a first direction. A second positioning guide is provided on the body for aligning the body on the diagram about a second direction. Floor covering width and length indicia are provided on the body along the first and second axes, respectively. Fill width indicia is provided on the body and corresponds to the first direction. A data matrix comprising multiple cells is defined by the intersection of the fill width indicia and the floor covering length indicia. At least some of the cells contain a fill length data indicia who's value is the length of the floor covering needed for a fill area corresponding to the intersecting fill width indicium and floor covering length indicium itself.

Preferably, at least one of the first and second positioning guides is an edge surface of the body. Alternatively or in combination, at least one of the first and second positioning guides is a line provided on the body. Yet another alternative or combination includes at least one of the first and second positioning guides being a slot formed in the body. While the range of values for the indicia can be any desired, is preferred that the width indicia at least include a value corresponding to the width of the floor covering whose length is being estimated.

The device can further comprises a second data matrix having multiple cells. Each of the cells corresponds to a floor covering length indicia and contains an area data value representing the area covered by a piece of floor covering of the predetermined width and the corresponding floor covering length indicia. The floor covering predetermined width is preferably selected from one of 12 feet, 13 feet 6 inches, and 15 feet. The floor covering width and length indicia are also of a predetermined scale. Is preferred that this predetermined scale be equal to the scale of the diagram. Suitable scales include one-eighth inch equals one foot, one-quarter inch equals one foot, and three-sixteenths inch equals one foot.

In one aspect, the floor covering width indicia can define the fill width indicia, negating the need to have separate indicia for both values. The floor covering width and length indicia can also form the corresponding first and second positioning guides.

The body can comprise first and second spaced sides and first and second spaced ends connecting the spaced sides to form a generally rectangular body. The body preferably has a width equal to the length of the sides and the body width is scaled relative to the predetermined width of the floor covering. The scale of the body width is equal to the scale of the diagram for which the floor covering is being estimated. Suitable scales include the one-eighth inch equals one foot, one-fourth inch equals one foot, and three-sixteenths inch equals one foot. Preferably, the floor covering predetermined width is one of 12 feet, 13 feet 6 inches, and 15 feet.

When the body takes a generally rectangular shape, it is preferred that the first end forms the first positioning guide and the first side formed the second positioning guide. In this configuration, it is also preferred that the floor covering width indicia is adjacent to and extends along the first end and the floor covering length indicia is adjacent to an extends along the first side. The fill width indicia can be defined by the floor covering width indicia or can parallel the floor covering width indicia as desired.

DETAILED DESCRIPTION

Figure 1:
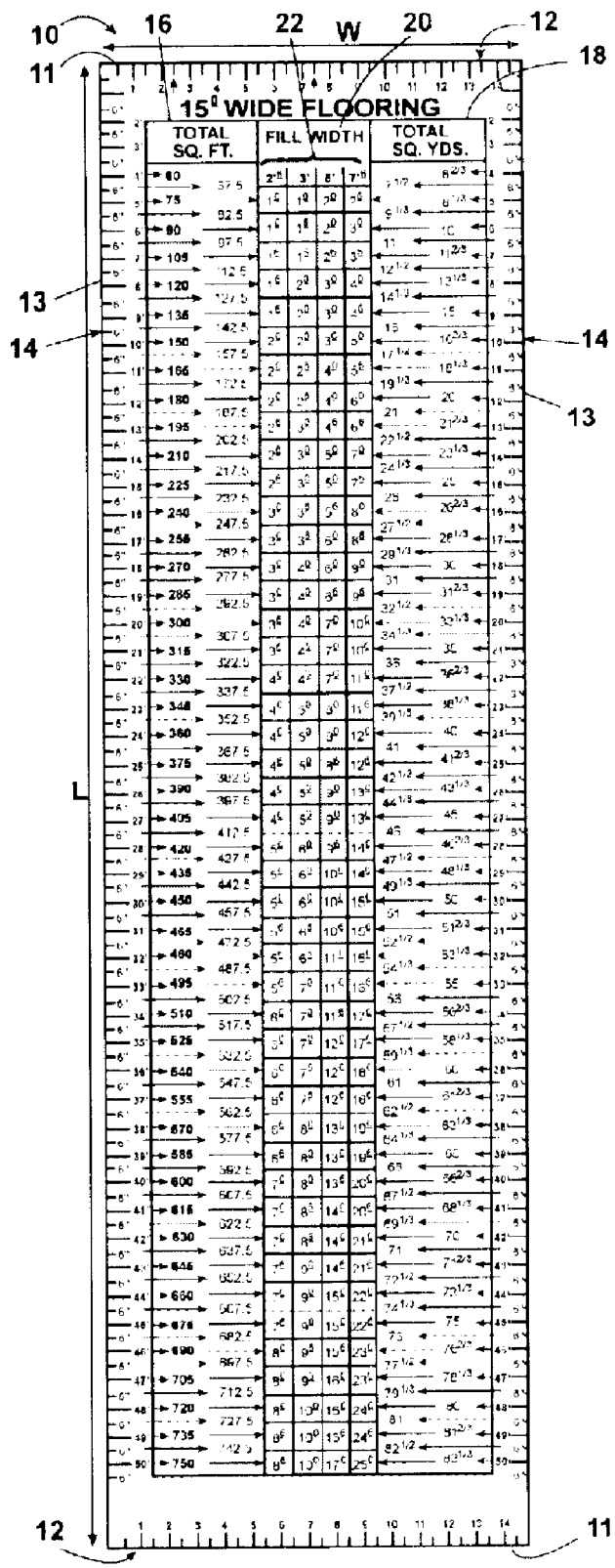
FIG. 1 illustrates a first embodiment of the floor covering estimating device according to the invention for a floor covering having a manufactured width of 15 feet.

FIG. 1 illustrates a floor covering estimating device in the form of a template 10 having opposing ends 11 of a predetermined width $W_T$ and opposing sides 13 of a predetermined length $L_T$. A width indicia 12 is disposed along the upper and lower edges of the width $W_T$. Similarly, a length indicia 14 is disposed along the edges of the length $L_T$. The width indicia and length indicia 12 and 14 are preferably selected to conform to a predetermined scale, such as a ¼ inch equals one foot scale as illustrated in FIG. 1. Preferably the width and length indicia 12, 14 are divided into full and half marks, representing one foot and half foot increments.

The width and length indicia are placed on both sides of the template 10 for convenience. Together, one pair of the width and length indicia form the indices of a matrix or grid representing the physical dimension of the template 10.

It should be noted, that for purposes of the invention, the width and length indicia 12, 14 can be selected for any desired scale. Preferably the scales are those most commonly used in the construction industry, such as ⅛ inch equals one foot, ¼ inch equals one foot, and ³⁄₁₆ inch equals one foot. It should also be noted that the width $W_T$ of the template 10 is preferably selected to correspond with a commonly sold floor covering width, such as 12 feet, 13 feet 6 inches, and 15 feet.

A column of first area indicia 16 is disposed on the template and positioned between the width and length indicia 12, 14. The area indicia 16 includes individual area values that are physically located on the template 10 so that they align with each of the full and half length indicia 14. The value of the area indicia 16 corresponds to the floor covering full width, 15 feet in the case of template 10, multiplied by the length indicia 14.

The area indicia 16 as illustrated in FIG. 1 preferably displays the area in units of square feet. A second column of area indicia 18 extends along an opposite side of the template 10 and is similar to the first area indicia 16, except that the second area indicia displays values of area in units of square yards.

It should be noted that while the template 10 preferably uses dimensions of square feet and square yards for the area indicia 16, 18, it is within the scope of the invention for any desired dimension to be used. Also, although two area indicia 16, 18 are disclosed in the template 10, any number of area indicia can be used and would depend on the particular needs of the user.

A fill width indicia 20 is arranged in columnar form and disposed between the area indicia 16 and 18. The intersection of the fill width indicia 20 and the length indicia 14 forms a data matrix comprising a plurality of cells arranged in multiple rows and columns, with each of the cells containing fill widths 22. The fill widths 22 of a particular cell correspond to the length of floor covering needed to fill an area having a width equal to the corresponding fill width indicia 20 and length indicia 14.

For the template 10, the predetermined fill widths 22 correspond to floor covering fill widths of 2 feet 6 inches, 3 feet, 5 feet, and 7 feet 6 inches. These predetermined fill widths are selected based on the most commonly occurring fill widths for a 15 foot width. The fill widths can include more, less, or different fill width data. The fill width data will also vary for carpets of different widths. For example, the common fill widths for a 12 foot wide floor covering are 2, 3, 4, and 6 feet. The common fill widths for a 13 foot 6 inch wide floor covering are 2 feet 3 inches, 3 feet 3 inches, 4 feet 6 inches, and 6 feet 9 inches.

The columnar indicia disposed underneath each of the predetermined fill width indicia 22 are physically positioned on the template 10 so that they align with one of the length indicia 14. The value of the columnar indicia disposed below the predetermined fill width indicia 22 represents the additional length that must be added to the full width floor covering length to permit a complete covering of a fill area corresponding to the predetermined fill width indicia 22 while minimizing the total area of the floor covering required to cover a room.

Figure 2:
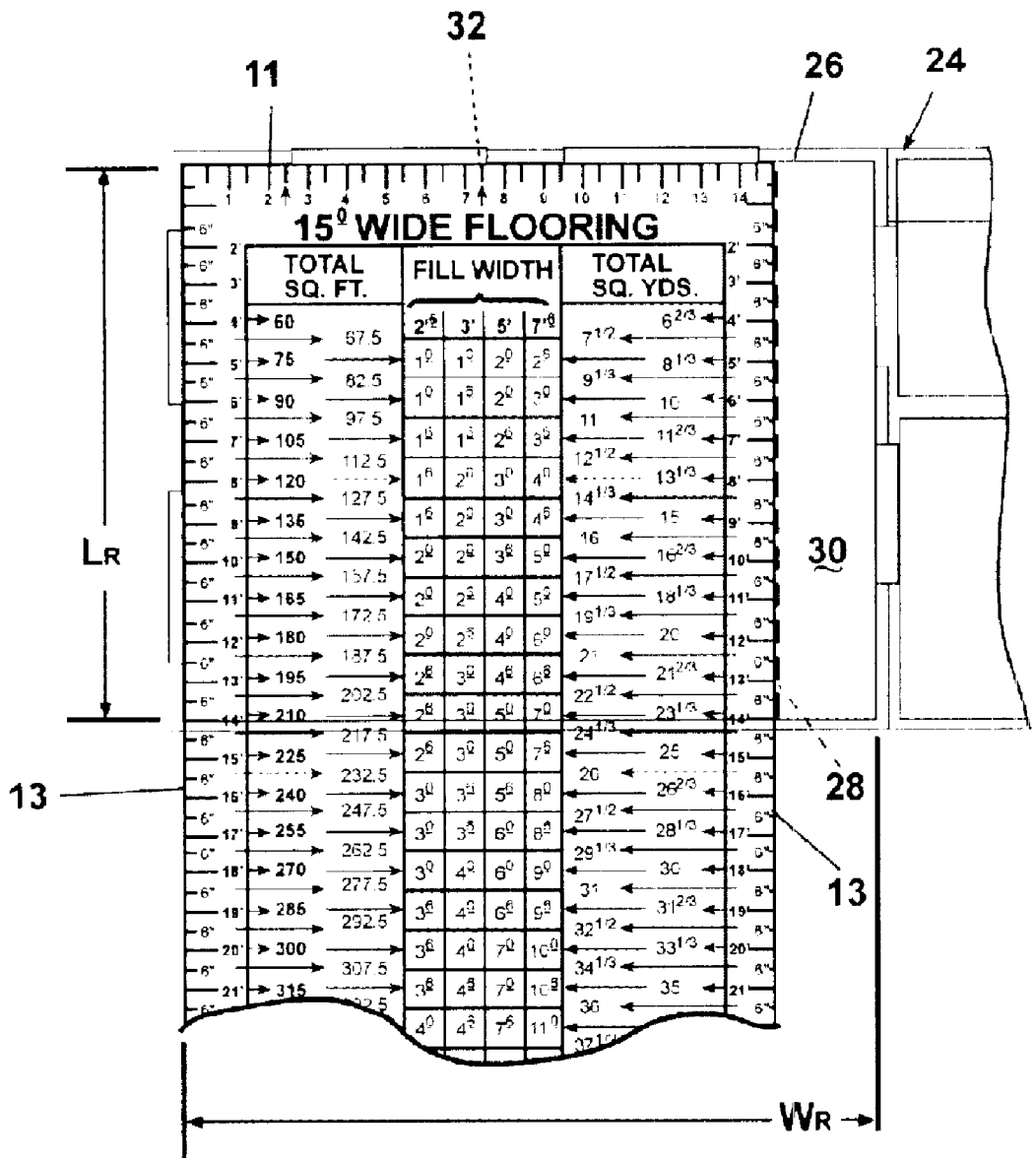
FIG. 2 illustrates the use of the first embodiment floor covering estimating device to determine the floor covering needed along a for the full-width area for a sample room along a first room dimension.

An explanation of the use of the template 10 will aid in the understanding of the importance of the spatial relationship and numerical value of the width indicia 12, length indicia 14, area indicia 16, area indicia 18, fill width indicia 20, and predetermined fill width indicia 22. FIG. 2 illustrates the template 10 in the context of an architectural drawing 24 having a room 26 with a room width $W_R$ of 17.5 feet and a room length $L_R$ of 14 feet. The room width $W_R$ and length $L_R$ can be thought of as the major and minor dimensions for the room 26 and also serve as the reference directions for positioning the template. To begin the floor covering estimating process, the template 10, which is of the same scale as the architectural drawing 24, is placed on the architectural drawing 24 so that one of the corners, preferably the upper right, of the template 10 coincides with a corner of the room 26 and the length $L_T$ of the template 10 coincides with the length $L_R$ of the room 26. In other words, the side of the template 10 is aligned with the diagram in a direction according to the room length and the end of the template 10 is aligned with the width of the room in a second direction. Essentially, the template ends 11 and sides 13 form positioning guides for positioning the template relative to the drawings such that the template end 11 is aligned relative to the room length and the template side 13 is positioned relative to the room width. In this manner, the full width run is parallel to the minor dimension of the room 26.

The user draws a line 28 along the side of the template 10, which divides the room 26 into a full width area 30 and a fill area 32. The length of the room is then noted along the length $L_T$ of the template 10 by referencing the length indicia 14, which is 14 feet in the case of the room 26. The area value corresponding to the 14 foot length value is selected from the area indicia 16 or 18. For purposes of this example, the area indicia 16 is selected, which shows the area covered by the template in the room 26 for the full width run is 210 square feet. The full width area represents the area of the room 26 that a full width of the floor covering will cover in a length of 14 feet.

Figure 3:
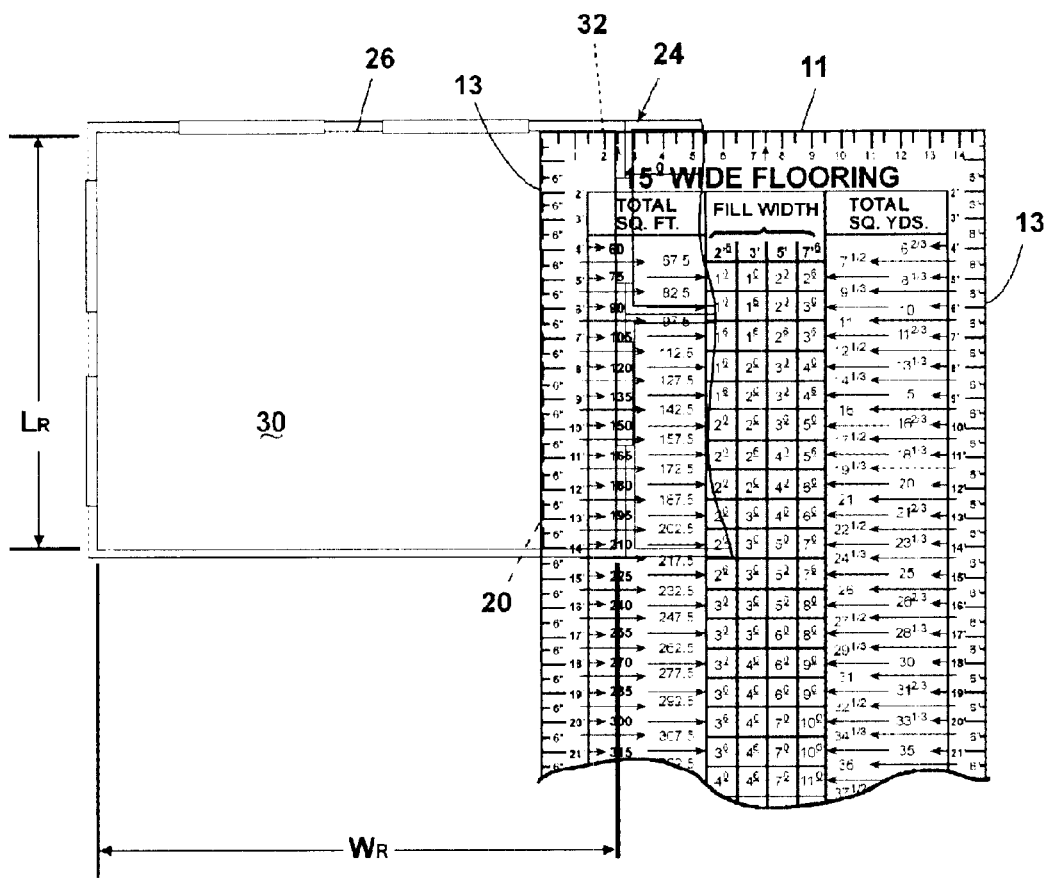
FIG. 3 illustrates the use of the first embodiment floor covering estimating device to determine the extra length of the floor covering needed to complete the fill area for the example of FIG. 3.

Once the full width area is determined, the amount of floor covering for the fill area 32 must be calculated. Referring to FIG. 3, the template 10 is moved so that the left hand length side of the template 10 is aligned with the room edge in the fill area and overlies the line 28. The template 10 is preferably transparent or translucent to permit the lines of the drawing 24 to be viewed through the template 10. The width indicia 12 is examined to determine the width of the fill area 32, which is 2 feet 6 inches in the example. The user then consults the fill width information 20 and selects the predetermined fill width indicia 22 corresponding to the measured fill width of 2 feet 6 inches. In the predetermined fill width indicia 22 corresponding to a 2 feet 6 inch fill width, the user selects the value in the fill width data column that corresponds to the room length $L_R$ of 14 feet, which equals 2 feet 6 inches. The 2 feet 6 inch value is the minimal additional length of floor covering that is required to cover the 2 foot 6 inch by 14 foot fill area 32 while minimizing the total area of the floor covering for a floor covering having a predetermined width of 15 feet. The total area of additional floor covering needed for the fill area is calculated by multiplying the additional length required for the 2 foot 6 inch fill area (2 feet 6 inches) by the width of the floor covering 15 feet, resulting in a floor covering fill area amount of 37.5 square feet.

The total square footage of floor covering needed to cover the room 26 is the sum of the area of the full width run (210 square feet) and the floor covering fill area total area (37.5 square feet) for a total area of 247.5 square feet. Thus, 247.5 square feet of floor covering is required to cover the floor of the room 26 if the full run is along the major dimension $L_R$.

The total area can easily be estimated using the template 10 by adding together the length of the full width run (14 feet) and the fill length (2 feet 6 inches) to obtain a total length (16 feet 6 inches), finding the total length on the template and examining the corresponding area. In a similar manner, the total area can be converted to square yards from square feet.

Figure 4:
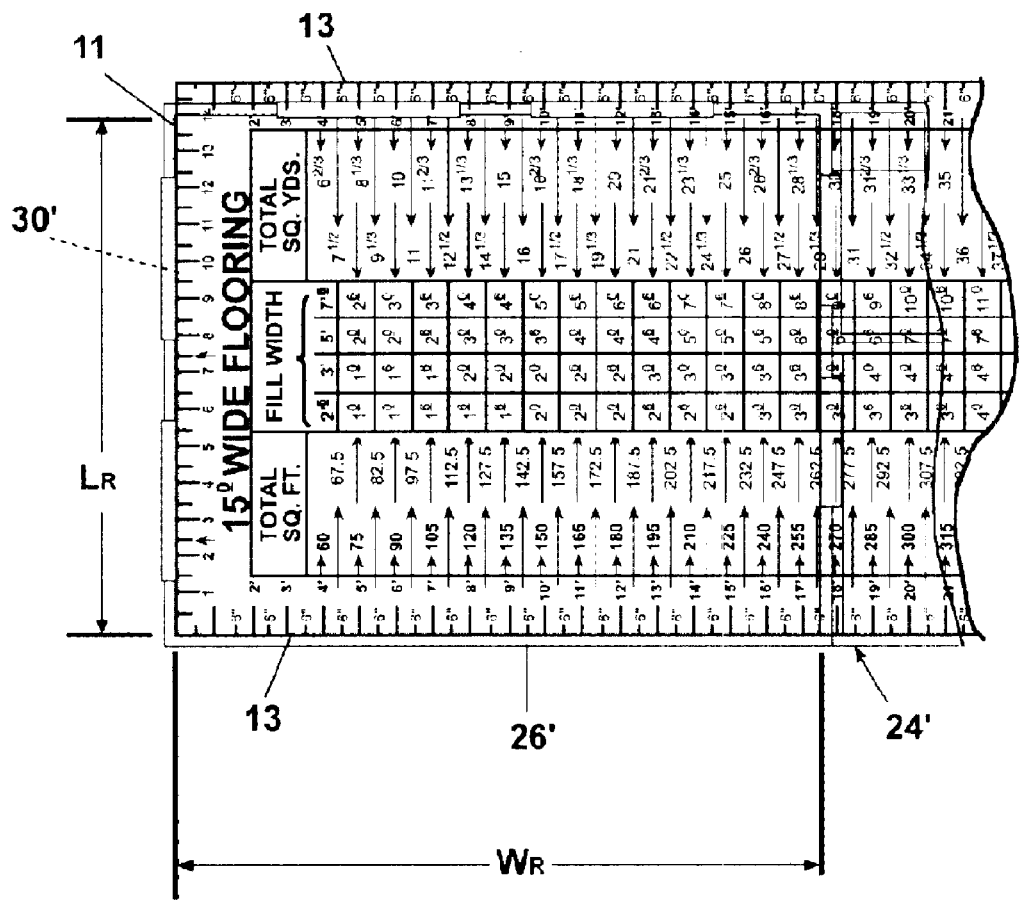
FIG. 4 illustrates the use of the first embodiment floor covering estimating device to determine the length of the floor covering the particular room for the full-width run along a second dimension.

To cover the floor of any room with the minimal amount of carpet and, thus, at the lowest expense, it is necessary to estimate the amount of floor covering with the full width run along the major dimension $W_R$. The direction of the full width floor covering run can result in different fill widths, which in most cases yields different total areas of floor covering required to cover the same room. Referring to FIG. 4, the floor covering is estimated by using the major dimension $W_R$ as the full width dimension. The steps of estimating the total floor covering along the major dimension $W_R$ are identical to the minor dimension $L_R$ except for the orientation of the template 10 with the major dimension $W_R$. Therefore, the steps will not be described in detail and only the results will be discussed.

Since the floor covering width is wider than the room width $W_R$, there will be no fill area. The full width area 30" of the room 26 is 262.5 square feet as seen in FIG. 4 since the full width run is 17 feet 6 inches. Orienting the floor covering in this manner eliminates seams in the carpet, but wastes a 1 foot by 17 foot 6 inch strip.

The total length of carpet needed to cover the room 26 is the full run along the room length $L_R$ of 16 feet 6 inches for a total area of 242.5 square feet. This is compared to the total length of the floor covering when the full width is aligned with the dimension $W_R$, which is 17 feet 6 inches for a total area of 262.5 square feet. As can be seen by these two estimations, less floor covering is needed to cover the room 26 if the full width run aligns with the minor dimension $L_R$.

It should be noted that the amount of material saved by having the full width run along the major or minor dimension will vary depending on the particular room size, the floor covering width, shape, and the fill area width. In some cases, there will be no savings as both approaches will result in the same total length of floor covering. However, the estimates must be made for both dimensions to ascertain the savings, if any. Also, for the example of FIG. 4, the estimator could opt for a different floor covering width.

The values for the predetermined fill width indicia 22 are calculated by determining the fill segment size that will minimize the total area of floor covering required to fill the fill area for a floor covering of a given width. This calculation is not as simple as buying the smallest area of carpet need to physically cover the fill area because many floor coverings are manufactured with a repeating pattern and carpet floor coverings are manufactured with a grain. The pattern and grain must be kept in mind when determining the fill width.

For example, in the floor covering estimation along the dimension $L_R$ shown in R FIGS. 2 and 3, the fill area is 2 feet 6 inches by 14 feet. Given that the floor covering width is 15 feet, one could purchase an additional 2 feet 6 inches of floor covering in the 15 foot width and use one 2 feet 6 inches by 15 feet piece to fill the fill area 32. However, that would require orientating the fill width portion of floor at ninety degrees relative to the full run. It is likely the rotation of the floor covering will result in a misalignment of any pattern on the floor covering. If the floor covering is carpet, then the grain of the fill area carpet will not align with the grain of the full run carpet, resulting in an aesthetically unappealing installation. The fill widths of the template 10 according to the invention help the estimator determine the minimum amount of floor covering needed for a proper installation.

It is of tremendous value to the floor covering estimator to have the optimum length corresponding to a particular fill width disposed on the template 10 in a physical location so that the additional fill length corresponds to the length of the fill area. The spatial association of the optimum length for a given fill width with the fill area length permits the floor estimator to quickly and easily estimate the most cost effective amount of floor covering needed to cover the floor for a particular room. This is a great advantage of the floor-covering estimating device according to the invention. In the past, the estimator would have had to calculate the optimum additional length, resulting in a loss of time and increasing the risk of error.

The floor covering estimating device according to the invention further simplifies the estimating process by providing a template 10 that has width and length indicia 12, 14 that correspond to the particular scale of the drawing 24 illustrating the room 26 whose floor covering is to be estimated. The placing and alignment of the template 10 on the drawing permits the user to almost instantaneously calculate the full width run length of the floor covering along with determining the corresponding area by reading the length and area indicia directly off the template. The template 10 further simplifies the determination of the fill area, which is accomplished by simply drawing a line along the right hand edge of the template 10. The fill area is then quickly and simply determined by noting the width of the fill area upon moving the template and finding the corresponding additional floor covering length that corresponds to the room length.

The usefulness of the invention becomes greater as the room shape becomes more complex. The examples in this application are limited to simple rectangular rooms with no closets, bump outs, insets, etc. As the shape of the room becomes more complex so does the difficulty of estimating the minimum amount of carpet. If a room becomes very complex, it is common for many estimators to request a much larger area of floor covering than necessary to simplify the estimation process. For example, if the room of FIGS. 2 and 3 had an inset, such as a built-in bench or cabinet, extending into the room, an estimator may be tempted to estimate the amount of floor covering required as the 15 foot width in a length equal to the width $W_R$, resulting in the waste of the floor covering that would have to be cut away for the inset. The template 10 of the invention provides for a simple and accurate estimation of complex room shapes, eliminating the need for over estimating.

Figure 5:
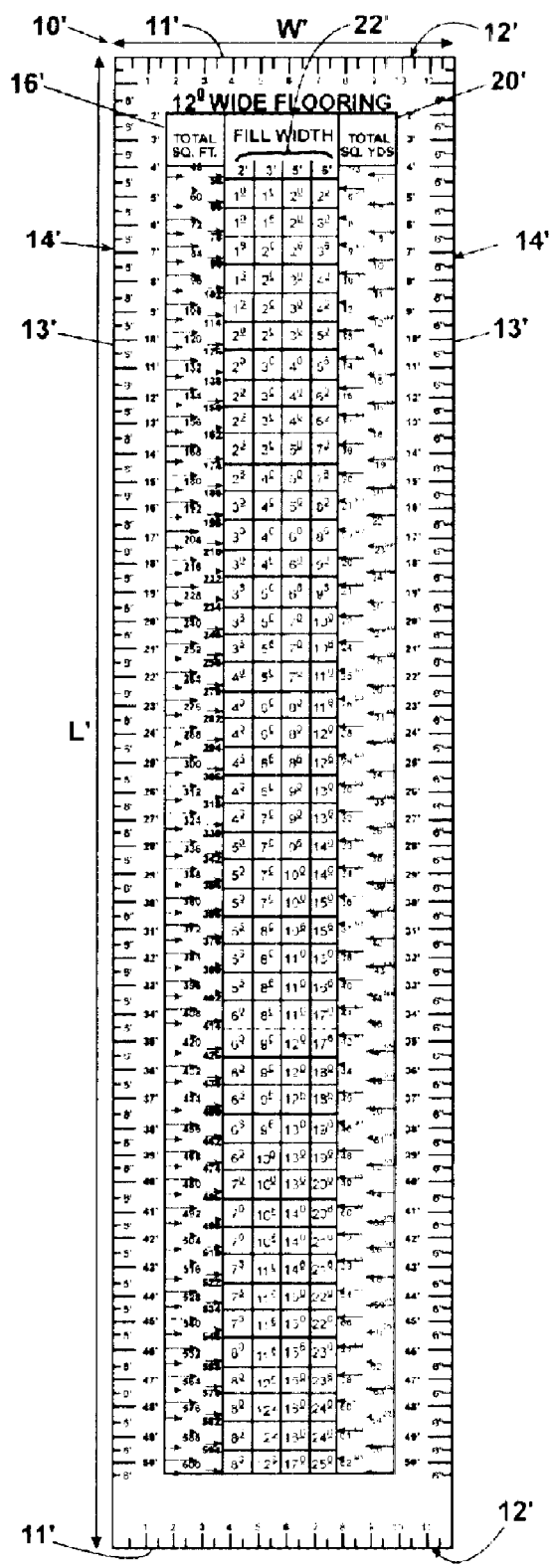
FIG. 5 illustrates a second embodiment of the floor covering estimating device according to the invention for a floor covering having a manufactured width of 12 feet.
Figure 6:
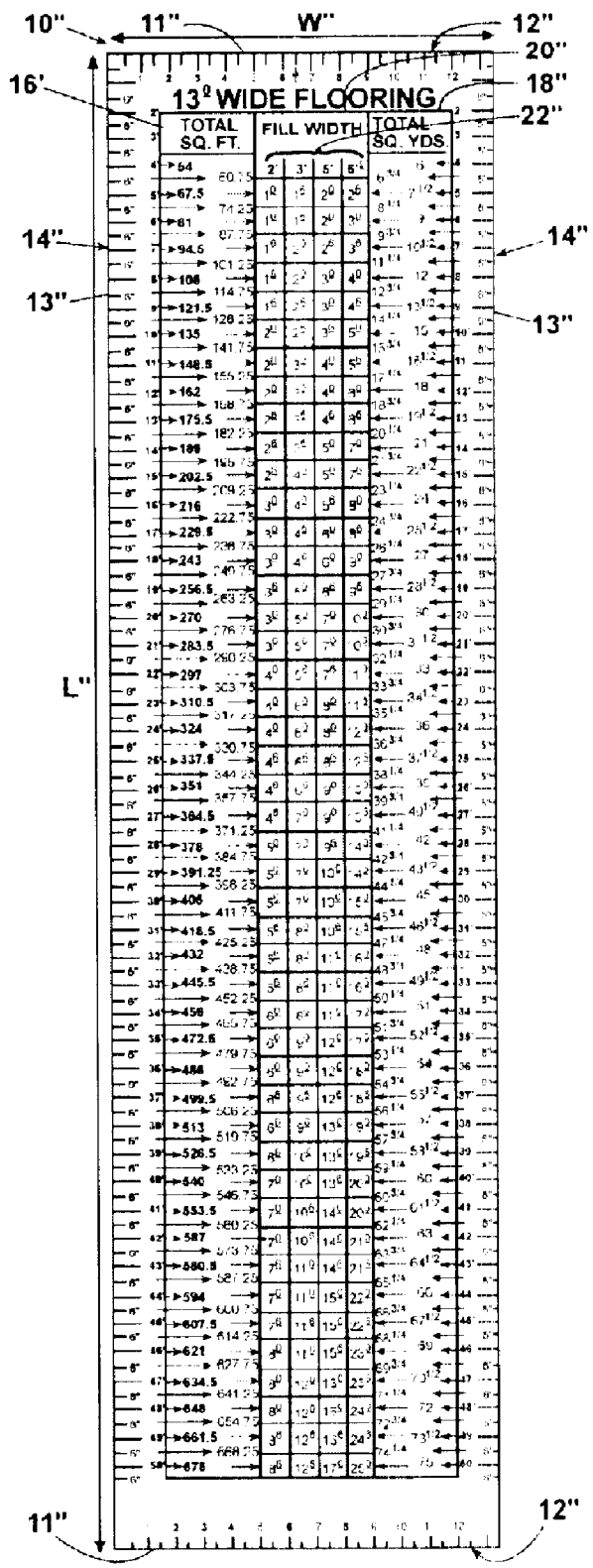
FIG. 6 illustrates a third embodiment of the floor-covering device according to the invention for a floor covering having a manufactured width of 13 feet 6 inches.

FIGS. 5 and 6 illustrate second and third embodiments of 10'' and 10 of the template 10. The second and third embodiments 10'', 10 are substantially identical to the first embodiment 10 and will not be described in detail other than noting the important distinctions. The second embodiment 10'' is floor covering having a manufactured width of 12 feet. The area indicia 16'' is limited to a single column unlike the two columns of area indicia 16, 18 of the first embodiment. However, the single column of area indicia 16'' of the second embodiment contained both area values in square feet and square yards separated by a slash. The fill width indicia 20'' has predetermined fill width indicia 22 arranged in fill width of 2 feet, 3 feet, 5 feet, and 6 feet 9 inches, which are the most common fill widths for a 12 foot wide floor covering.

The third embodiment template 10 has width indicia 12 and length indicia 14 located about the width and length of the template 10. The area indicia is arranged in two columns 16, 18, corresponding to area values and square foot units and square yard units, respectively. The fill width indicia 20 includes predetermined fill width indicia 22 in values of 2 feet, 3 feet, 5 feet, and 6 feet 9 inches, which are the most common fill widths for a 13 foot wide floor covering.

Figure 7:
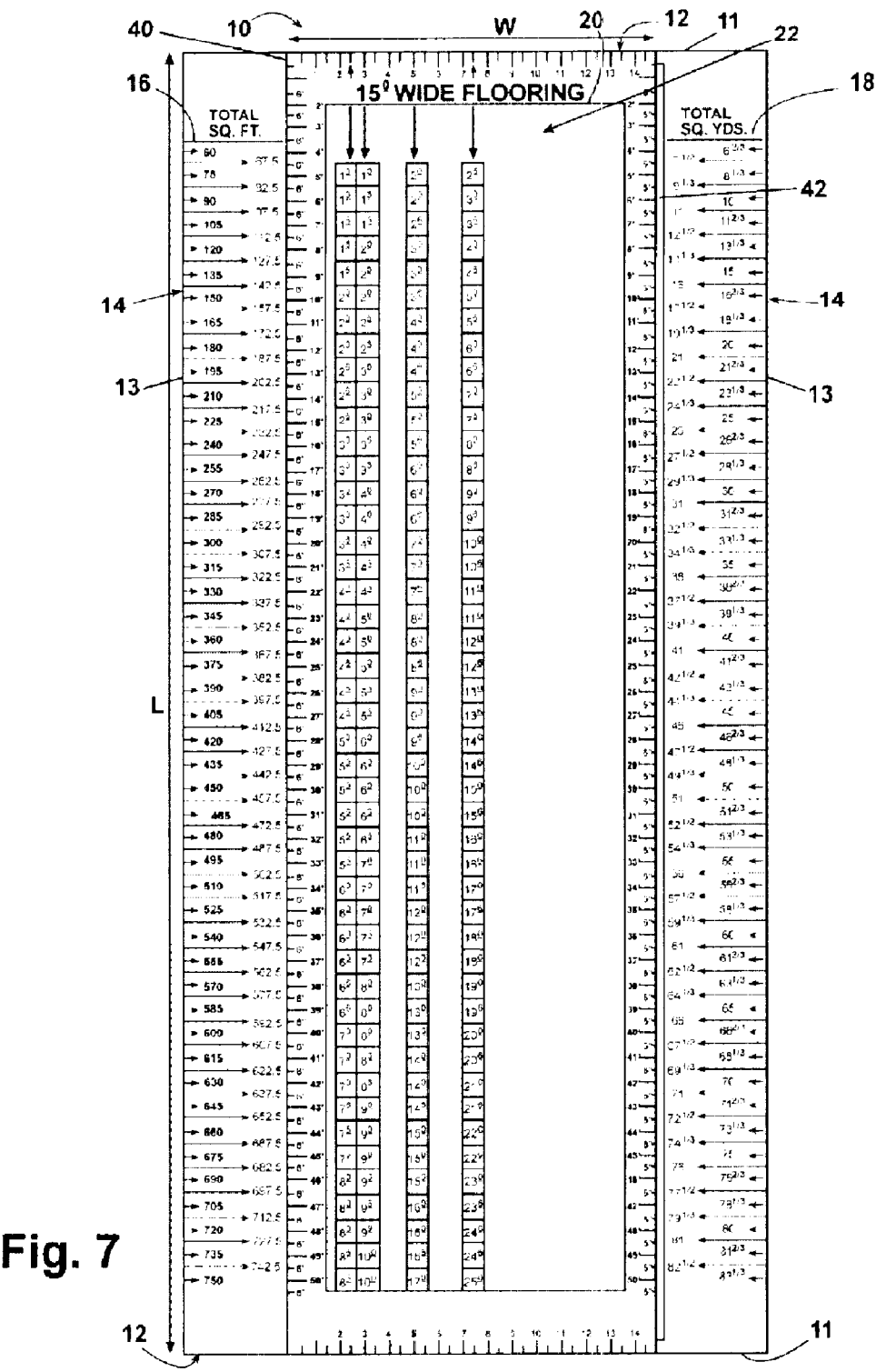
FIG. 7 illustrates a fourth embodiment of the floor-covering device according to the invention.

It is worth noting that the fill width indicia on the template 10 is for clarity sake limited to the most commonly occurring fill widths for a particular floor covering width. However, it is within the scope of the invention for the fill width data to be provided for the entire floor covering width. In such a configuration, the width indicia 12 would serve the dual role of the width indicia 12 and the headings for the fill width indicia 22. The intersection of the width indicia 12 and the length indicia 14 would then define the data matrix containing the fill width data. Not all of the cells of the data matrix need to have fill width data. FIG. 7 illustrates a portion of the template 10 where the width indicia 12 also functions as the fill width indicia 22 and not all of the cells of the resulting data matrix contain fill width information.

If the data matrix takes up a sufficient amount of space on the template 10 so that there is not enough space to clearly display the area indicia 16, 18, the physical size of the template 10 can be increased so that one or both of the area indicia 16, 18 can be moved outside of the area bounded by the width and length indicia 12, 14, such as is disclosed in FIG. 7.

In this configuration, if the area indicia 16 is moved to the left of the length indicia (as viewed in FIG. 1), it is convenient to use another structure other than the template sides 13 to function as a positioning guide for the template. Other suitable structures would include a line as 40 as shown in FIG. 7, which is preferably used when the template is made of a non-opaque material, or a slot (not shown), which is preferably used when the template is made of an opaque material.

Also in this configuration, if the area indicia 18 is moved to the right of the length indicia (as viewed in FIG. 1), it is convenient to use another structure other than the template sides 13 to function as a line-drawing guide. A suitable structure would include a slot 42 formed in the template 10. The slot 42 should be wide enough to permit the insertion of a tip from a writing utensil. Such a slot could also be used for the positioning guide when the template is made from an opaque material.

While the invention has been specifically described in connection with certain specific embodiments thereof, it is to be understood that this is by way of illustration and not of limitation, and the scope of the appended claims should be construed as broadly as the prior art will permit.

What is claimed is:

1. A device for estimating the length of a floor covering needed from a roll of a floor covering having a predetermined width to cover a room including any fill area based on a scaled diagram of the room showing walls bounding the room, the device comprising:

a generally planar body having an upper surface and an opposing lower surface for contacting the diagram;

a first positioning guide provided on the body for aligning the body on the diagram about a first direction;

a second positioning guide provided on the body for aligning the body on the diagram about a second direction;

a floor covering width indicia provided on the body along the first direction;

a floor covering length indicia provided on the body along the second direction;

a fill width indicia provided on the body and corresponding to the first direction; and a data matrix comprising multiple cells defined by the intersection of the fill width indicia and the floor covering length indicia, with at least some of the cells containing a fill length data indicium having a value representing the length of floor covering needed for a fill area corresponding to the intersecting fill width indicium and floor covering length indicium for the cell.

2. The device according to claim 1, wherein at least one of the first and second positioning guides is an edge surface of the body.

3. The device according to claim 1, wherein at least one of the first and second positioning guides is a line provided on the body.

4. The device according to claim 1, wherein at least one of the first and second positioning guides is a slot formed in the body.

5. The device according to claim 1, wherein the floor covering width indicia includes an indicium having a value equal to the predetermined width of the floor covering.

6. The device according to claim 5, and further comprising a second data matrix having multiple cells, with each of the cells corresponding to a floor covering length indicia and containing an area data indicium having a value representing the area covered by a piece of floor covering of the predetermined width and the corresponding floor covering length indicia.

7. The device according to claim 6, wherein the floor covering predetermined width is one of 12 feet, 13 feet 6 inches, and 15 feet.

8. The device according to claim 1, wherein the floor covering width and length indicia are of a predetermined scale.

9. The device according to claim 8, wherein the floor covering width and length indicia predetermined scale are equal to the scale of the diagram.

10. The device according to claim 9, wherein the predetermined scale is one of ⅛ inch equals 1 foot, ¼ inch equals 1 foot, and 3/16 inch equals 1 foot.

11. The device according to claim 1, wherein the floor covering width indicia defines the fill width indicia.

12. The device according to claim 1, wherein at least one of the floor covering width and length indicia forms the corresponding one of the first and second positioning guides.

13. The device according to claim 1, wherein the body comprises first and second spaced sides and first and second spaced ends connecting the spaced sides to form a generally rectangular body.

14. The device according to claim 13, wherein the body has a width equal to the length of the sides and the body width is a scaled relative to the predetermined width of the floor covering.

15. The device according to claim 14, wherein the scale of the body width is equal to the scale of the diagram for which the floor covering is being estimated.

16. The device according to claim 15, wherein the predetermined scale is one of ⅛ inch equals 1 foot, ¼ inch equals 1 foot, and 3/16 inch equals 1 foot.

17. The device according to claim 16, wherein the floor covering predetermined width is one of 12 feet, 13 feet 6 inches, and 15 feet.

18. The device according to claim 15, wherein the first end forms the first positioning guide and the first side forms the second positioning guide.

19. The device according to claim 18, wherein the floor covering width indicia is adjacent to and extends along the first end and the floor covering length indicia is adjacent to and extends along the first side.

20. The device according to claim 19, wherein the floor covering width indicia defines the fill width indicia.

21. The device according to claim 19, wherein the fill width indicia parallels the floor covering width indicia.

* * * * *